United States Patent Office 3,148,943
Patented Sept. 15, 1964

3,148,943
NOVEL PROCESS FOR PREPARING
ANTIMONY OXYCHLORIDE
Clarence K. Banks, Westfield, and Leonard M. Edwards,
Cranford, N.J., assignors to M & T Chemicals Inc.,
New York, N.Y., a corporation of Delaware
No Drawing. Filed Dec. 26, 1962, Ser. No. 247,379
15 Claims. (Cl. 23—85)

This invention relates to a process for preparing crystalline antimony oxychloride.

Antimony oxychloride has found use in the preparation of flame resistant compositions and luminescent coatings. This compound has not realized its fullest potential, however, because of its high cost resulting from the lack of a convenient, economical, commercially feasible method for its preparation.

Antimony oxychloride has heretofore most commonly been prepared by the hydrolysis of antimony trichloride according to the reaction:

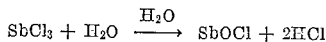

$$SbCl_3 + H_2O \xrightarrow{H_2O} SbOCl + 2HCl$$

This reaction suffers from a great many deficiencies. For example, it is apparent that one mole of antimony trichloride is consumed for each mole of antimony oxychloride produced. Antimony trichloride is a relatively expensive raw material. Moreover, it is highly corrosive and reactive and may, therefore, be difficult to handle and store. A substantial portion of the antimony oxychloride produced may be retained in solution, and the yield of desired product may thus be greatly reduced. Reaction conditions may be critical, since side reactions may readily occur and the yield of desired antimony oxychloride may be reduced thereby or the product may be undesirably contaminated. Typical yields may be less than 30% of theoretical.

Other attempts have been made to prepare antimony oxychloride from other antimony-containing raw materials, but these processes have been found unsatisfactory for large-scale commercial production since they may be characterized by low volume efficiency, poor yields, complicated procedures, and contaminated products.

It is an object of this invention to provide a process for preparing antimony oxychloride. It is a further object to prepare antimony oxychloride from antimony trioxide. Other objects will be apparent to those skilled in the art upon reading the following description.

In accordance with certain of its aspects, the process of this invention for preparing crystalline antimony oxychloride comprises maintaining an aqueous medium containing at least about 30% by weight of hydrogen chloride; adding antimony trioxide and antimony trichloride as reactants to said aqueous medium thereby forming crystalline antimony oxychloride; and separating said crystalline antimony oxychloride from said aqueous medium.

The fresh charge aqueous medium employed in practice of this invention may be an aqueous solution of hydrogen chloride, preferably containing at least about 30% by weight hydrogen chloride and preferably 30%–40%. Higher concentrations up to saturation (e.g. about 44%) may also be employed. A preferred aqueous medium may be commercially available concentrated hydrochloric acid which may typically contain about 36–37% by weight hydrogen chloride. Where the aqueous medium contains at least about 30% by weight hydrogen chloride, highly satisfactory yields of crystalline antimony oxychloride may be obtained. In preferred embodiments, these yields may approach 100%. Conversely, where the aqueous medium contains appreciably less than 30% by weight hydrogen chloride, little or no antimony oxychloride may be produced.

It is a feature of this invention that the fresh charge aqueous medium containing hydrogen chloride may also contain therein antimony oxychloride, typically in amount up to that sufficient to saturate the medium. Preferably this medium may be saturated at the temperature, typically 20° C.–85° C., say 40° C. at which the reactants may be added thereto.

The antimony trichloride (SbCl₃) employed may be of commercial purity characterized by its substantially anhydrous composition. Normally, it may be used as such and may not require further purification. Similarly, commercial grades of antimony trioxide (Sb₂O₃) may be used, such as the antimony trioxide sold under the trademark Thermoguard H.

In practice of this invention, the reaction of antimony trichloride and antimony trioxide may take place as follows:

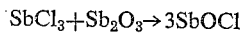

$$SbCl_3 + Sb_2O_3 \rightarrow 3SbOCl$$

Preferably one mole of antimony trichloride may react with one mole of antimony trioxide to produce three moles of product antimony oxychloride. Typically, 1–2 moles of antimony trichloride may be employed per mole of antimony oxide. Preferably the total amount of antimony trichloride added may be such that any excess over the stoichiometric quantity will form a solution which is less than saturated with antimony trichloride. In the preferred embodiments of this invention, the antimony trioxide and antimony trichloride may be reacted together in substantially equimolar amounts. If a substantial excess of antimony trioxide is employed, the product may be undesirably contaminated with unreacted antimony trioxide. An excess of antimony trichloride does not lead to contamination of the product since this material is soluble in the aqueous medium. However, no apparent advantage may be found in using excess antimony trichloride.

The antimony trichloride and antimony trioxide may preferably be separately added to the aqueous medium. Preferably the antimony trichloride may be dissolved first in the aqueous medium and the antimony trioxide may be added thereto slowly, e.g. over a period of 30–120 minutes, say 60 minutes, to prevent formation of mixtures characterized by lumping and high viscosity. Preferably, the reactants may be uniformly dispersed throughout the aqueous medium by means of a mechanical stirrer or the like. The addition may be carried out at temperatures lower than about 85° C., typically 20° C.–50° C., say 40° C. but higher temperatures may be employed if desired. The weight ratio of aqueous medium to reactants may preferably be chosen to give an easily-stirrable mixture and good heat transfer. Typically, satisfactory results may be obtained where 100 parts by weight of aqueous medium is employed with about 150–600 parts by weight of reactants. Preferably 100 parts of aqueous medium and 200–300 parts of reactants may be employed.

When the addition is complete, the resultant mixture may be heated, preferably with stirring, to a temperature of about 80–110° C. Preferably, the mixture may be heated to reflux e.g. 109–110° C., and under reflux the reaction may be substantially complete in a relatively short time e.g. 20–120 minutes, typically less than about 60 minutes. Lower temperatures may be employed, but reaction times may be correspondingly increased.

As the reaction progresses, crystalline antimony oxychloride may be formed and may precipitate from the aqueous medium. At the completion of the reaction, the aqueous medium may be cooled typically to 20–30° C. say 25° C. and the antimony oxychloride may be separated therefrom as by filtration, decantation, or centrifuging. The product may if desired be washed with e.g. acetone, methyl ethyl ketone, ethylhexanal, diacetyl acetone, or other suitable inert solvent to remove residual traces of aqueous medium. The product may then be dried, typically air-dried, to yield crystalline antimony oxychloride of high purity.

It may be found that a portion of the product antimony oxychloride, e.g. up to about 40%, typically 15–40%, thereof may remain in solution in the aqueous medium recovered from the separation. It is a particular feature of this invention that at least a portion of the aqueous medium recovered from the reaction and containing antimony oxychloride, may be employed as at least a portion of the aqueous medium for the reaction i.e. it may be recycled. The recovered aqueous medium may be so employed as it is recovered, or fresh aqueous medium may be added thereto e.g. to make up losses due to occlusion on the product. In this manner, the yield of product antimony oxychloride in subsequent reactions may be maximized and may typically approach the theoretical yield.

Thus, in accordance with certain of its preferred aspects, the process of this invention for preparing crystalline antimony oxychloride comprises maintaining as initial aqueous medium an aqueous medium containing at least about 30% by weight hydrogen chloride; adding antimony trioxide and antimony trichloride as reactants to said aqueous medium thereby forming crystalline antimony oxychloride; separating said crystalline antimony oxychloride from said aqueous medium; recovering said aqueous medium saturated with antimony oxychloride; and recycling at least a portion of said recovered aqueous medium to form at least a portion of said initial aqueous medium.

The process of this invention is particularly characterized by its ability to give high yields of crystalline antimony oxychloride desirably having a number average particle or crystal size of about 4–100 microns, preferably about 8–35 microns. Crystalline antimony oxychloride having this particle size range, may be used as a flame retardant for organic polymeric materials, e.g. poly(vinyl chloride), and these compositions may be characterized by an unexpectedly high degree of clarity. It may unexpectedly be found that the process of this invention may permit reproducible attainment of product having a number average particle size within the desired range.

Practice of this invention may be further illustrated by reference to the following examples wherein all parts are parts by weight unless otherwise specified.

*Example 1*

In this example, which exemplifies the preparation of antimony oxychloride according to this invention, a reaction vessel was fitted with a mechanical stirrer, heating mantle, thermometer, and condenser. 119 parts of commercial concentrated hydrochloric acid (37% HCl) was placed therein as the aqueous medium. 139 parts of antimony trichloride was added thereto and dispersed. 177 parts of antimony trioxide (i.e. one mole per mole of antimony trichloride) was added slowly in small increments over a period of about one hour, during which time the temperature of the aqueous medium was held at about 40° C. When the addition was complete, the resultant mixture was heated with stirring to reflux (109° C.). Refluxing and stirring were maintained for one hour during which time antimony oxychloride was formed and precipitated from the solution. At the end of the reaction period, the mixture was cooled to room temperature and the product separated from the aqueous medium by filtration. The product was washed with acetone to a negative chloride test and dried in a vacuum desiccator to constant weight. The yield was 244.5 parts (77.5%) of crystalline antimony oxychloride having an analysis of 70.7% Sb (theory 70.5%) and 20.3% Cl (theory 20.5%). An X-ray diffraction test showed this material to be SbOCl. The average particle size was within the approximate range of 8–35 microns.

From an inspection of Example 1 it may be seen that the process of this invention permits preparation of high yield of crystalline antimony oxychloride of exceptional purity. Moreover, the process of this invention may be characterized by rapid rates of reaction, ease of operation and high volume efficiencies.

*Example 2*

A series of experiments was carried out to determine the optimum concentration of hydrogen chloride in the aqueous medium. The basic procedure of Example 1 was followed except that 142 parts of antimony trioxide, 112 parts of antimony trichloride (i.e. one mole per mole of antimony trioxide), and about 115 parts of aqueous medium were employed. The concentration of hydrogen chloride in the aqueous medium in the three experiments A, B, and C was varied as set forth in the table infra.

The products were separated, washed, and dried as in Example 1. The nature of the products was confirmed by X-ray diffraction. Experiment A yielded 185.3 parts (71.5%) of crystalline antimony oxychloride. Experiment B gave 190.2 parts (73.5%) crystalline antimony oxychloride. Experiment C gave 158 parts of a material which was identified as antimony pentoxydichloride ($Sb_4O_5Cl_2$). No antimony oxychloride was found in the product of Experiment C.

| Experiment | Percent By Weight HCl | Yield, Percent |
|---|---|---|
| A | 34 | 71.5 |
| B | 30 | 73.5 |
| C | 26 | 0 |

From Example 2 as may be seen that the process of this invention (exemplified by experiments A and B) wherein the aqueous medium contains at least about 30% by weight hydrogen chloride, permits attainment of high yields of crystalline antimony oxychloride. Where the aqueous medium contains appreciably less than 30% hydrogen chloride (q.v. Experiment C) the product is not antimony oxychloride and may be antimony pentoxydichloride. It has been found that antimony pentoxydichloride may be prepared by reacting antimony trioxide and antimony trichloride in an aqueous medium containing less htan about 30% and typically about 14–26% by weight hydrogen chloride; and separating said antimony pentoxydichloride from said aqueous medium.

*Example 3*

This example illustrates the embodiment of this invention wherein the aqueous medium may be recovered from the reaction and recycled for use as the aqueous medium in a subsequent reaction. 556 grams of antimony trichloride and 708 grams of antimony trioxide (e.g. equimolar amounts) were reacted in 400 cc. of commercial concentrated hydrochloric acid (37%) as the aqueous medium according to the procedure of Example 1. 971 grams (77%) of antimony oxychloride was obtained and 390 cc. of aqueous medium were recovered. The recovered aqueous medium was employed as the aqueous medium in a second preparation of antimony oxychloride wherein 519 grams (1.78 moles) of antimony trioxide and 407 grams (1.78 moles) of antimony trichloride were used. The yield in this second preparation was 852 grams (92%) of crystalline antimony oxychloride.

The aqueous medium from the second preparation was again recovered. Use of recovered aqueous media in further preparations consistently gave yields between 90% and 100% of theory.

As may be seen from Example 3, recovery and recycling of aqueous medium according to a preferred embodiment of this invention may permit attainment of unexpectedly improved yields of product.

It will be apparent that when the aqueous medium includes antimony oxychloride from e.g. the recycled solution, the designated concentrations by weight of the hydrogen chloride refer to the total weight of water plus hydrogen chloride without reference to the particular amount of antimony oxychloride. In other words, an aqueous medium within the scope of this invention whether it includes recycled solution or not, may be one containing at least about 43 parts by weight of hydrogen chloride per 100 parts by weight of water. This is equivalent to a 30% by weight solution of hydrogen chloride in water containing no additional solute.

Although this invention has been illustrated by reference to certain specific examples, many modifications thereof which clearly fall within the scope of the invention will be apparent to those skilled in the art.

We claim:

1. The process for preparing crystalline antimony oxychloride which comprises maintaining an aqueous medium containing at least about 30% by weight of hydrogen chloride adding antimony trioxide and antimony trichloride as reactants to said aqueous medium thereby forming crystalline antimony oxychloride; and separating said crystalline antimony oxychloride from said aqueous medium.

2. The process for preparing crystalline antimony oxychloride as claimed in claim 1 wherein the antimony trichloride is present in the amount of at least one mole per mole of antimony trioxide.

3. The process for preparing crystalline antimony oxychloride as claimed in claim 1 wherein the antimony trichloride and antimony trioxide are present in substantially equimolar amounts.

4. The process for preparing crystalline antimony oxychloride as claimed in claim 1 wherein the reaction is carried out at a temperature of about 80–110° C.

5. The process for preparing crystalline antimony oxychloride as claimed in claim 1 wherein the reaction is carried out under reflux at reflux temperature.

6. The process for preparing crystalline antimony oxychloride which comprises maintaining an aqueous medium containing about 30–40% by weight of hydrogen chloride; adding antimony trioxide and antimony trichloride as reactants to said aqueous medium in the ratio of at least one mole of antimony trichloride per mole of antimony trioxide thereby forming crystalline antimony oxychloride; and separating said crystalline antimony oxychloride from said aqueous medium.

7. The process for preparing crystalline antimony oxychloride as claimed in claim 6 wherein the antimony trichloride and antimony trioxide are present in substantially equimolar amounts.

8. The process for preparing crystalline antimony oxychloride as claimed in claim 6 wherein the reaction is carried out at a temperature of about 80–110° C.

9. The process for preparing crystalline antimony oxychloride as claimed in claim 6 wherein the reaction is carried out under reflux at reflux temperature.

10. The process for preparing crystalline antimony oxychloride which comprises maintaining an aqueous medium containing 30–40% by weight hydrogen chloride; adding substantially equimolar amounts of antimony trioxide and antimony trichloride as reactants to said aqueous medium; heating the resultant mixture to about 80–110° C. thereby forming crystalline antimony oxychloride; and separating said crystalline antimony oxychloride from said aqueous medium.

11. The process for preparing crystalline antimony oxychloride which comprises maintaining an initial aqueous medium containing at least about 30% by weight of hydrogen chloride; adding antimony trioxide and antimony trichloride as reactants to said aqueous medium thereby forming crystalline antimony oxychloride; separating said crystalline antimony oxychloride from said aqueous medium; recovering said aqueous medium saturated with antimony oxychloride; and recycling at least a portion of said recovered aqueous medium to form at least a portion of said initial aqueous medium.

12. The process for preparing crystalline antimony oxychloride as claimed in claim 11 wherein the antimony trichloride is present in the amount of at least one mole per mole of antimony trioxide.

13. The process for preparing crystalline antimony oxychloride as claimed in claim 11 wherein the reaction is carried out at a temperature of about 80–110° C.

14. The process for preparing crystalline antimony oxychloride which comprises maintaining an aqueous medium containing about 30–40% by weight of hydrogen chloride; adding antimony trioxide and antimony trichloride in substantially equimolar amounts as reactants to said aqueous medium; heating the resultant mixture to about 80° C.–110° C. thereby forming crystalline antimony oxychloride; separating said crystalline antimony oxychloride from said aqueous medium; recovering said aqueous medium; and recycling at least a portion of said aqueous medium to form at least a portion of said initial aqueous medium.

15. The process for preparing crystalline antimony oxychloride which comprises maintaining an aqueous medium containing antimony oxychloride and at least about 30% by weight of hydrogen chloride; adding antimony trioxide and antimony trichloride as reactants to said aqueous medium thereby forming crystalline antimony oxychloride; and separating said crystalline antimony oxychloride from said aqueous medium.

References Cited in the file of this patent

J. W. Mellor's "A Comprehensive Treatise on Inorganic and Theoretical Chemistry," vol. 9, 1929 edition, pages 504, 505, Longmans, Green and Co., N. Y.